June 15, 1965 C. OWEN 3,188,904
ANCHOR NAIL FASTENER
Filed Aug. 22, 1960
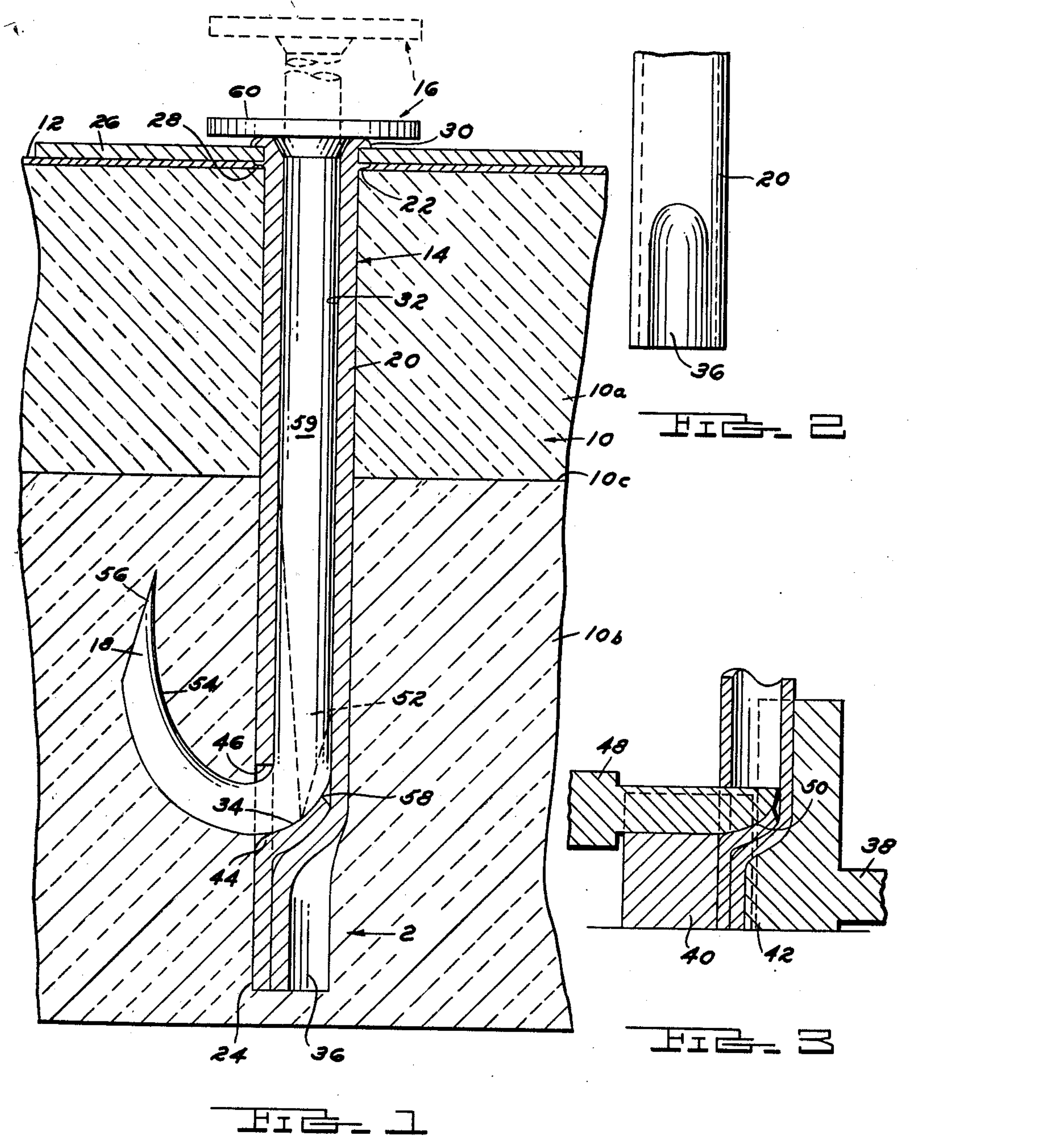
INVENTOR.
CHARLES OWEN
BY
Burton & Parker
ATTORNEYS United States Patent Office 3,188,904

Patented June 15, 1965

3,188,904

ANCHOR NAIL FASTENER

Charles Owen, Americus, Ga., assignor, by mesne assignments, of one-half to Simplex Nail & Manufacturing Corporation, Americus, Ga., a corporation of Michigan Filed Aug. 22, 1960, Ser. No. 50,935
1 Claim. (Cl. 85—23)

This invention relates to an anchor nail fastener.

The principal object of this invention is the provision of a fastener which will hold in a relatively dense material but which material has voids therein that prevent the use of a conventional fastener, such as a nail, because the conventional fastener will fail to grip sufficiently within the material and may be readily pulled therefrom. The anchor nail disclosed herein is of particular utility with insulation board of the types sold under the trademarks TECTUM insulation board and INSULROCK insulation board.

Another object of the invention is the provision of an anchor nail fastener comprising a nail guide and deflector member which is driven into the work or board in which the fastener is to be secured, with a nail-like member being thereafter driven into the nail guide and deflector member with the nail guide and deflector member deflecting the pointed end of the nail laterally outwardly into the work or board to securely anchor the nail and the nail guide and deflector member in the work.

Another object of the invention is the provision of an anchor nail guide and deflector member comprising a tube having means at the outer end for limiting the penetration of the tube as it is driven into a board with the inner end of the tube provided with a laterally opening aperture and with means in the tube at the lower end thereof providing a nail point-deflecting surface for deflecting the pointed end of a nail driven into the tube laterally away from the tube. Such deflecting surface may be so shaped, and the nail may be so pointed, that the nail point curls laterally outwardly through the aperture and upwardly outside of the tube.

Other objects, advantages, and meritorious features will more fully appear from the specification, claims, and accompanying drawings wherein:

FIG. 1 is a side elevation partially in section of a preferred embodiment of the invention;

FIG. 2 is a view of the lower end of the nail guide and deflector member looking in the direction of arrow 2 in FIG. 1; and FIG. 3 is a schematic illustration of one method of fabricating the lower end of the nail guide and deflector member to provide the nail-deflecting surface therein.

The fastener disclosed herein is, as mentioned hereinabove, particularly suitable for use with a relatively dense board having voids therein which prevent the satisfactory utilization of conventional nail type fasteners. While the fastener is particularly suitable for use with insulation board of the type sold under the trademarks of TECTUM insulation board or INSULROCK insulation board, the nail may also be used with other types of board and applications for use with natural wood boards are feasible. The term "board," as used herein and in the claims, is intended as a generic expression covering all materials with which the fastener may prove satisfactory. The insulation board for which this fastener has been particularly designed may be of the type made of wood shavings held together by suitable binder. The fastener may be used to secure waterproof paper, such as tar paper or the like, upon the insulation board, or to secure two boards together, either one or both of which may be dense material having voids preventing use of conventional nail type fasteners. The fastener may also find use in polyurethane foam or like materials for securing coverings, accessory items, or parts thereto.

FIG. 1, by way of example in solid outline, shows the fastener in place within insulation board or the like 10 holding to a surface thereof a sheet of tar paper or the like 12. The board 10 is of the aforementioned character comprising a relatively dense material held together with a suitable binder and having voids therein. The board 10 may be of one piece or may be of two pieces **10*a* and 10*b* meeting at the interface 10*c*** and held together by the fastener.

The fastener comprises a nail guide and deflector generally indicated at 14 and an anchor nail generally indicated at 16. As shown, the nail guide and deflector member has been driven into the board 10 and the nail 16 has been driven into the nail guide and deflector with its pointed end 18 curled laterally outwardly and upwardly through the opening through which it passes in the wall of the nail guide and deflector.

The nail guide and deflector preferably comprises a tube 20 formed of seamless steel tubing. Other forms of tubing may be found to be satisfactory but the seamless steel type has the requisite strength and rigidity suited for the intended purpose herein disclosed. The tube is provided with upper and lower ends 22 and 24 respectively. Means are provided at the upper end of the tube for limiting its penetration of the board 10 and also for holding the tar paper 12 or other material which is to be secured to the board 10. Such means preferably comprises an annular flange 26 of washer-like shape which is secured rigidly to the upper end of the tube by upsetting the tube as at 28 and 30.

The tube is provided with an axial bore 32 which is closed at the lower end 24 of the tube with means at the lower end providing a nail point-deflecting surface 34. Such means comprise inwardly deflected portions of the tube wall. As shown in FIGS. 1 and 2, the lower end of the tube has been pinched inwardly as at 36 to substantially close the lower end. This may be accomplished through the use of cooperating male and female dies 38 and 40 respectively, schematically shown in FIG. 3. The female die is provided with a semi-circular recess 42 within which the lower end of the tube is laid with the male die 38 having a relatively narrow edge which is urged against the tube to press one wall portion of the tube inwardly and against the opposite wall portion to form the lower end to the shape shown in FIGS. 1 and 2.

Such means providing the nail point-deflecting surface also includes an inwardly deflected portion of the tube wall shown at 44. Such portion 44 results from punching inwardly the tube wall to provide the side opening aperture 46 through which the nail point is deflected. A suitable punch for effecting this operation is schematically shown in FIG. 3 at 48. The punch 48 is moved in the direction of the arrow associated therewith toward the tube wall and in opposition to the male die 38 while the male die remains in contact with the tube after having deformed the tube wall inwardly as above mentioned. The punch shears through the tube wall and with the radiused surface 50 bends or lays inwardly the punched wall portion 44 urging it down against the inner surface of the inwardly deflected wall portion 36 such that portion 44 abuts the inner surface of portion 36 supporting the same and preventing any substantial downward axial movement of portion 44 under the driving action of the nail 16 as it is driven into the tube. With the provision of the radiused surface 50 on the punch, portion 44 exhibits an arcuate or dished surface at 34, which facilitates the lateral outward and upward deflection of the nail point. It will be observed that surface 34, in addition to being curvate, is disposed on an acute angle with respect to the axis of bore 32 of the tube. The angle between surface 34 and the bore of the tube will serve to institute an outward deflection of the pointed end of the nail.

In order to facilitate the outward and upward curling of the pointed end of the nail, the nail is tapered at its pointed or lower end 52 as at 54. This may be accomplished by flattening one side of the nail throughout a portion of its length to provide a relatively long needle nose-type point. A nail is conventionally provided with a short bevel at its point which is indicated in the drawing at 56. Bevel 56 will ensure that the point of the nail will not catch in the space 58 that may sometimes occur at the lower inner end of the bore 32 of the tube as a result of the inward deflection of portion 44. The long taper 54 serves to sufficiently weaken the pointed end of the nail so that it will more readily deflect laterally outwardly through the side opening aperture 46 than penetrate to any substantial extent the nail-deflecting surface 34. The steel of which the tube 20 is formed should be of such hardness in relation to the metal of the nail 16 that no substantial penetration of the surface 34 will result. It has been found that conventional standard seamless steel tubing without any special hardness treatment or of special hard quality will function satisfactorily when utilizing conventional type nail wire.

The nail 16, in addition to the shank portion 59, has a head portion 60 for limiting the amount by which the nail is driven into the tube and for securing the tube within the work 10. In some instances it may be found desirable to utilize the head 60 of the nail for securing covering material or some article to the work 10 for which purpose the shank 58 of the nail would be passed through the covering or article to be secured to the work 10. The length of taper 54, it will be observed in the dotted outline of FIG. 1, is such that when the nail is driven home, the tapered surface will extend from substantially the opening 46 to the point of the nail. Whether the nail is inserted in the tube with the taper 54 facing the side opening aperture 46 or whether it is in some other rotated position, is of no consequence as the weakening of the pointed end by the provision of the taper 54 will serve to cause the pointed end to readily curl outwardly through opening 46.

It will be observed that the pointed end of the nail not only extends laterally outwardly but curls through substantially 180 degrees of arc. Such upward curling is facilitated by the radius or dish shape of the surface 34. Once the pointed end of the nail begins to deflect with each hammer stroke on the nail, the surface of the nail engaging the radiused surface 34 will impart an upward curling to the pointed end. The laterally outwardly and upwardly curled pointed end of the nail will serve to anchor the fastener in the board into which the pointed end extends.

The bore of the tube which closely fits about the nail serves to prevent buckling of the nail as it is driven into the tube and upon initial insertion of the nail in the tube guides the pointed end against the nail-deflecting surface at the bottom of the tube bore.

In some instances it may prove desirable to provide the radiused nail-deflecting surface 34 with a concave or trough-like shape to guide the pointed end of the nail outwardly through the aperture. In this event the radiused surface 50 of the punch 48 may have a convex surface in cross section for forming the concave surface in the nail-deflecting surface 34.

The large head or flange 26 at the upper end of the tube prevents the tube from being driven into the board beyond the point shown in FIG. 1 when the nail is driven into the tube.

What is claimed is:

An anchor nail fastener comprising, in combination: an elongate tubular member of resistingly deformable metal having upper and lower ends to be driven lower end first into a workpiece, means adjacent the upper end of the member for limiting penetration of a workpiece, the wall of said tubular member provided with a side opening aperture spaced upwardly from the lower end with a portion of the wall extending inwardly and upwardly from the lower edge of the aperture across the interior of the tubular member to the opposite interior wall face thereof to provide an upwardly facing surface for deflecting the point of a nail driven downwardly through the tubular member laterally outwardly through said aperture, the wall of said tubular member at that side of the member opposite the aperture and throughout the distance between said inwardly and upwardly extending tubular wall portion and the lower end of the tube being radially inwardly displaced toward and against the apertured side of the tube to substantially close the lower end of the tubular member with the upper end of said radially inwardly displaced wall abutting substantially the entire underside of the wall portion defining the nail point deflecting surface to reinforce such wall portion against downward collapse during deflection of a nail laterally outwardly through said aperture, and a nail having a laterally deflecting lower end to be driven lower end first axially into the tubular member and against the nail deflecting surface thereof for laterally deflecting the lower end of the nail outwardly through said aperture and into the workpiece.

References Cited by the Examiner

UNITED STATES PATENTS

| | | | |
|---|---|---|---|
| 276,511 | 4/83 | Wakeman | 85—23 |
| 2,048,093 | 7/36 | Alpeters | 85—28 |

FOREIGN PATENTS

| | | |
|---|---|---|
| 75,727 | 5/92 | Germany. |
| 663,604 | 8/29 | France. |

EDWARD C. ALLEN, *Primary Examiner.*

CARL W. TOMLIN, *Examiner.*